United States Patent
Lee et al.

(10) Patent No.: US 10,224,017 B2
(45) Date of Patent: Mar. 5, 2019

(54) ACTIVE SOUND DESENSITIZATION TO TONAL NOISE IN A VEHICLE

(71) Applicant: Ford Global Technologies, LLC, Dearborn, MI (US)

(72) Inventors: Ming-Ran Lee, Troy, MI (US); Ming-te Cheng, Ann Arbor, MI (US); Ramasunder Krishnaswami, Farmington Hills, MI (US); Liqun Na, Northville, MI (US); Mingfeng Li, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 15/498,134

(22) Filed: Apr. 26, 2017

(65) Prior Publication Data
US 2018/0315413 A1    Nov. 1, 2018

(51) Int. Cl.
*H04B 1/00* (2006.01)
*H03G 3/00* (2006.01)
(Continued)

(52) U.S. Cl.
CPC ............ *G10K 11/178* (2013.01); *B60L 1/00* (2013.01); *H04R 3/04* (2013.01); *H04R 3/12* (2013.01); *B60L 2270/00* (2013.01); *G10K 2210/1282* (2013.01); *G10K 2210/3028* (2013.01); *G10K 2210/3044* (2013.01); *H04R 2499/13* (2013.01)

(58) Field of Classification Search
CPC ................. G06F 3/165; G10K 11/175; G10K 11/178–11/17885; G10K 2210/1282; G10K 2210/3028; G10K 2210/3044; H04R 3/04; H04R 2499/13

USPC ...... 381/61, 73.1, 86, 71.1–71.14, 94.1–94.3; 340/384.1, 384.3, 384.7, 384.73
See application file for complete search history.

(56) References Cited

U.S. PATENT DOCUMENTS

| | | | | |
|---|---|---|---|---|
| 5,635,903 A | * | 6/1997 | Koike | A63H 17/34 340/384.1 |
| 6,356,185 B1 | * | 3/2002 | Plugge | G10H 1/00 340/384.3 |

(Continued)

FOREIGN PATENT DOCUMENTS

| | | |
|---|---|---|
| DE | 102014220573 A1 | 4/2016 |
| EP | 2845773 A1 | 3/2015 |

(Continued)

OTHER PUBLICATIONS

Search Report dated Oct. 19, 2018 for GB Patent Application No. GB 1806695.1 (3 pages).

*Primary Examiner* — Xu Mei
(74) *Attorney, Agent, or Firm* — James P. Muraff; Neal, Gerber & Eisenberg LLP

(57) ABSTRACT

Method and apparatus are disclosed for active sound desensitization to tonal noise in a vehicle. An example vehicle includes an electric motor, a microphone, speakers, and an active sound desensitizer. The active sound desensitizer (a) randomizes channels of the speakers based on multiple uncorrelated broadband sound profiles, (b) determine upper and lower frequency band limits for a band-limited filter, (c) generate a desensitizing sound based on the upper and lower frequency band limits and the randomized channels, and (d) broadcast the desensitizing sound via the speakers.

15 Claims, 9 Drawing Sheets

(51) Int. Cl.
  *G10K 11/178*  (2006.01)
  *H04R 3/04*   (2006.01)
  *H04R 3/12*   (2006.01)
  *B60L 1/00*   (2006.01)

(56) References Cited

U.S. PATENT DOCUMENTS

| | | | | |
|---|---|---|---|---|
| 7,203,321 | B1 * | 4/2007 | Freymann | B60Q 5/00 |
| | | | | 381/61 |
| 8,384,528 | B2 * | 2/2013 | McCarthy | H04S 7/00 |
| | | | | 123/184.21 |
| 9,050,925 | B2 * | 6/2015 | Meschke | G10K 15/02 |
| 9,180,840 | B2 | 11/2015 | Tanaka et al. | |
| 9,218,801 | B2 * | 12/2015 | Reilly | G10K 11/175 |
| 9,478,214 | B2 * | 10/2016 | Orth | G10K 15/02 |
| 9,693,139 | B1 * | 6/2017 | Teknos | G10K 11/178 |
| 10,011,224 | B2 * | 7/2018 | Chang | B60Q 9/00 |
| 10,065,561 | B1 * | 9/2018 | Bastyr | B60Q 5/008 |
| 2015/0043744 | A1 | 2/2015 | Lagodzinski et al. | |
| 2015/0343999 | A1 | 12/2015 | Lopez Galera et al. | |

FOREIGN PATENT DOCUMENTS

| | | | |
|---|---|---|---|
| EP | | 2955069 A1 | 12/2015 |
| WO | WO 2015/120866 A1 | | 8/2015 |

\* cited by examiner

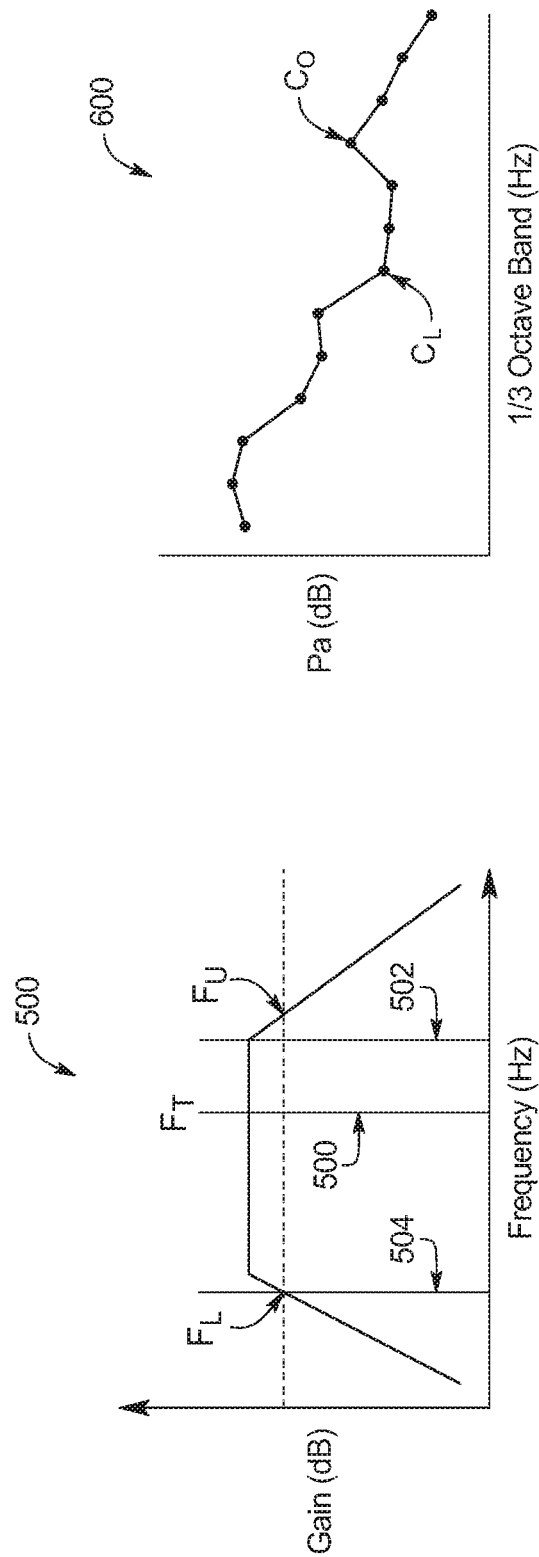

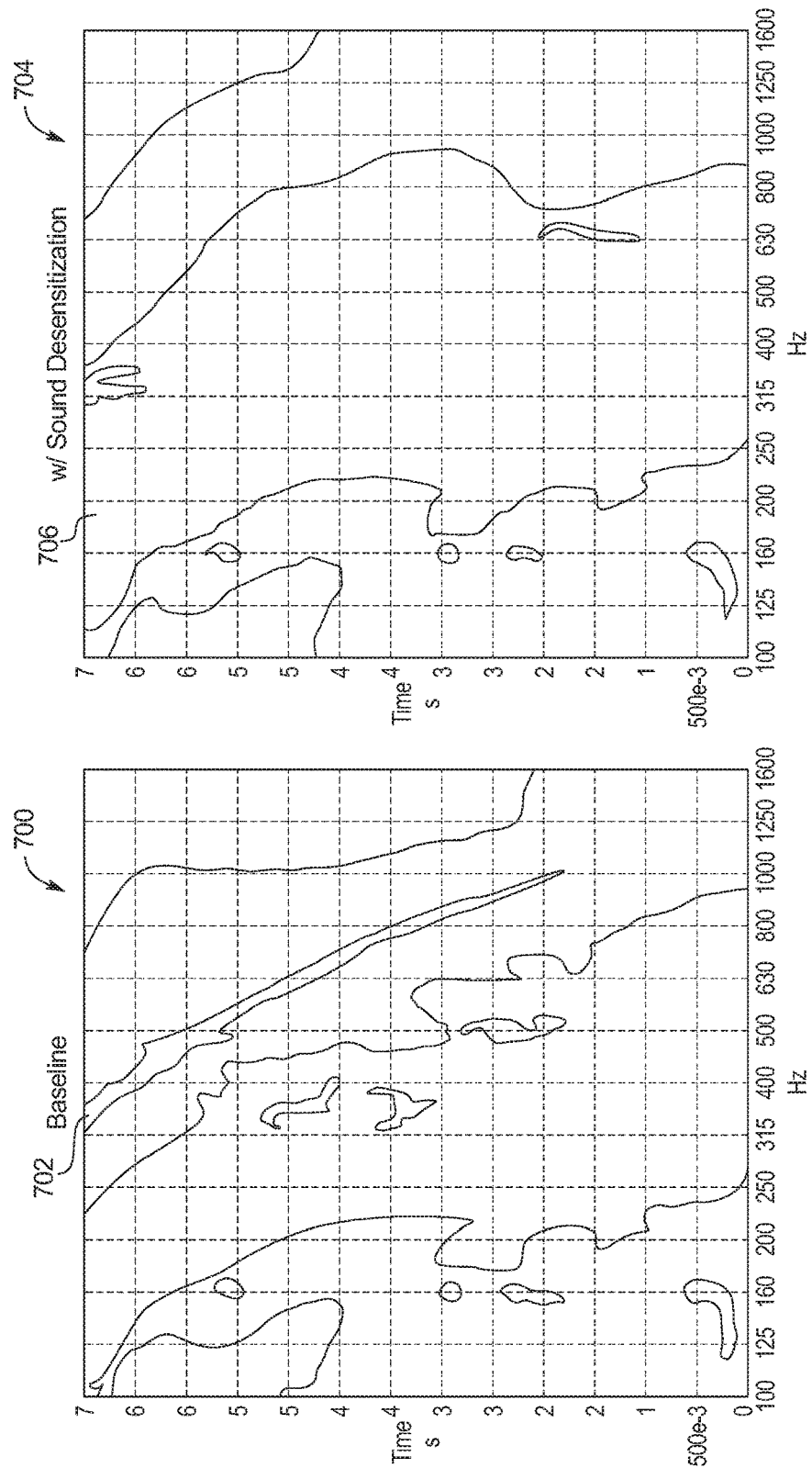

ACTIVE SOUND DESENSITIZATION TO TONAL NOISE IN A VEHICLE

TECHNICAL FIELD

The present disclosure generally relates to vehicles with electric motors and, more specifically, active sound desensitization to tonal noise in a vehicle.

BACKGROUND

Electrified (i.e. Hybrid/Electric) and fuel-cell vehicles exhibit different noise characteristics from conventional combustion engine powered vehicles. Tonal noise (sometimes referred to as "whine noise") induced by electric motors/generators in these vehicles can be disturbing for occupants of the vehicle in various driving conditions because of an absence of background engine noise associated with, for example, acceleration, deceleration, and braking conditions. A tonal noise has pitch over a narrow band of frequencies. Humans are good at selectively hearing tonal noise when immersed in broadband noise despite the tonal noises being relatively quiet compared to broadband noises. Because they stand out, tonal noises tend to be more annoying and/or distracting than the broadband noises.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for active sound desensitization to tonal noise in a vehicle. An example vehicle includes an electric motor, a microphone, speakers, and an active sound desensitizer. The active sound desensitizer (a) randomizes channels of the speakers based on multiple uncorrelated broadband sound profiles, (b) determine upper and lower frequency band limits for a band-limited filter, (c) generate a desensitizing sound based on the upper and lower frequency band limits and the randomized channels, and (d) broadcast the desensitizing sound via the speakers.

An example method includes randomizing output to channels of speakers based on multiple uncorrelated broadband sound profiles. The multiple uncorrelated broadband sound profiles are based on a sound map of audio in a cabin of a vehicle captured by a microphone The method also includes determining upper and lower frequency band limits for a band-limited filter. Additionally, the method includes generating a desensitizing sound based on the upper and lower frequency band limits and the randomized channels, and broadcasting the desensitizing sound via the speakers.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 5 is a diagram of the upper and lower limits of a band-limiting filter of the sound desensitizer of FIGS. 1 and 2.

FIG. 6 is a diagram of an example octave frequency band to determine the lower limit of the band-limiting filter of the sound desensitizer of FIGS. 1 and 2.

FIGS. 7A and 7B example sound maps before and after active sound desensitization.

DETAILED DESCRIPTION OF EXAMPLE EMBODIMENTS

Figure 1:
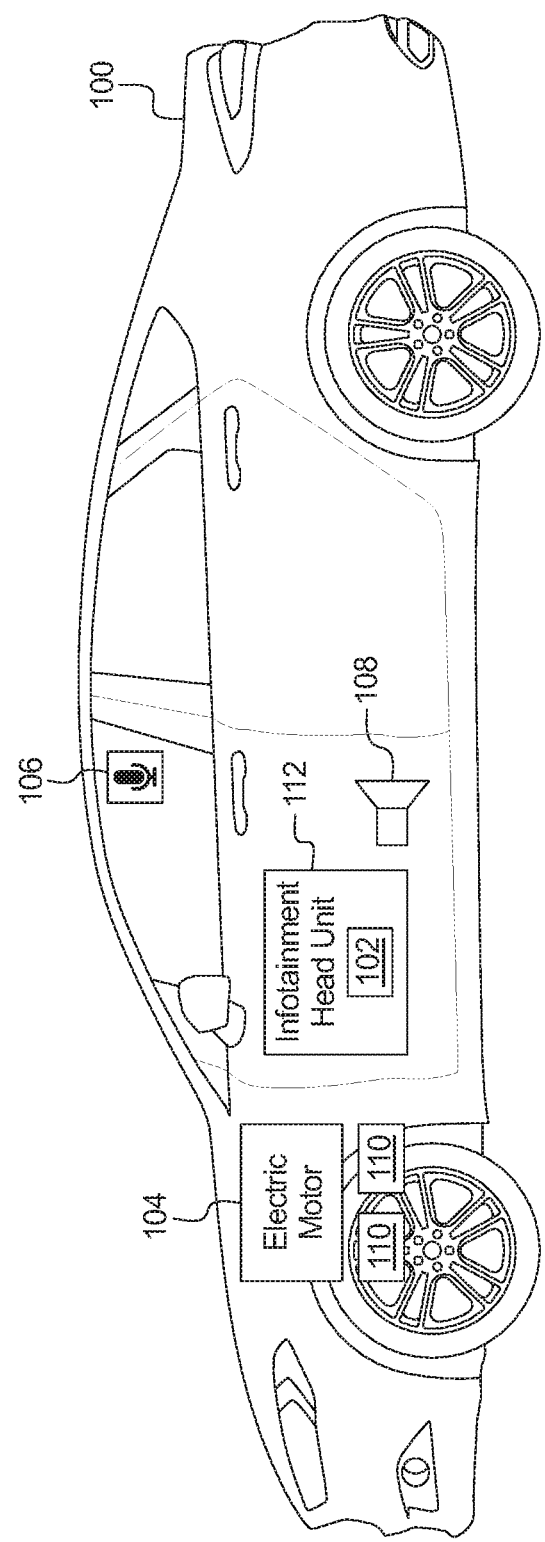
FIG. 1 illustrates a vehicle with an active sound desensitizer in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Electric motors, such as those used in electric, hybrid, and fuel cell vehicles produce a tonal noise. The tonal noise is a noise with a narrow frequency band. This tonal noise is generated by the electromagnetic forces in the electric motor that drives a crank shaft. Traditionally, to reduce the tonal noise in the vehicle cabin is to optimize electric motor design in terms of noise, vibration, and harshness, which can affect weight, cost, and/or fuel economy, etc.

As described below, a sound system of the vehicle actively desensitizes the tonal noise to increase comfort and reduce distractions for the occupants of the vehicle. The sound system produces a desensitizing sound in the vehicle cabin thought the speakers. The desensitizing sound is based on the vehicle operational data and the frequencies of the tonal noise. A broadband sound with a shaped-spectral goes through a band-limited filter in real-time to generate a control signal. The control signal is output buy the vehicle speakers to provide the desensitizing sound to the vehicle cabin. The desensitizing sound then blends with the tonal noise to psycho-acoustically alleviate the perception of the tonal noise. The frequency-dependent band-limited filter masks the tonal noise and its vicinity frequencies. The frequency band of the band-limited filter is based on the tonal noise frequency and a spectral profile of background cabin noise. Additionally, the frequency band of the band-limited filter has upper and lower limits that are asymmetric to a target tonal frequency. The target tonal frequency is not centered between the upper and lower limits. The filter gain is adjusted in real-time per multi-dimensional look-up tables, which are predetermined based on vehicle/motor operational conditions, tonal noise amplitude, surrounding band noise level, as the audio system acoustical characteristics.

FIG. 1 illustrates a vehicle 100 with an active sound desensitizer 102 in accordance with the teachings of this disclosure. The vehicle 100 may be a hybrid vehicle, an electric vehicle, a fuel cell vehicle, and/or any other mobility implement type of vehicle with an electric motor 104. The vehicle 100 includes parts related to mobility, such as a powertrain, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes a microphone 106, speakers 108, electronic control units (ECUs) 110, and an infotainment head unit 112.

The microphone 106 is positioned near wherein the driver's ear is when the driver is seated. For example, the microphone 106 may be position on a headrest of a driver's seat or a center roof console. The microphone 106 captures the sound in the cabin of the vehicle 100 as heard by the driver. The captured sound is used to create sound mappings of the tonal noise and surrounding band noise level various operational conditions that include the tonal noise from the electric motor 104.

The speakers 108 are positioned in various locations within the vehicle 100 (e.g., the panels of the front doors, the panels of the rear doors, the dashboard, the A-frame column, etc.). The speakers 108 are communicatively coupled to a sound system of the infotainment head unit 112. The speakers 108 are communicative coupled to different channels (e.g., a left channel, a right channel a rear channel, a front channel, etc.). The speakers 108 play the desensitizing sound into the cabin.

The ECUs 110 monitor and control the subsystems of the vehicle 100. The ECUs 110 communicate and exchange information via a vehicle data bus ((e.g., the vehicle data bus 802 of FIG. 8 below). Additionally, the ECUs 110 may communicate properties (such as, status of the ECU 110, sensor readings, control state, error and diagnostic codes, etc.) to and/or receive requests from other ECUs 110. Some vehicles 100 may have seventy or more ECUs 110 located in various locations around the vehicle 100 communicatively coupled by the vehicle data bus. The ECUs 110 are discrete sets of electronics that include their own circuit(s) (such as integrated circuits, microprocessors, memory, storage, etc.) and firmware, sensors, actuators, and/or mounting hardware. The ECUs 110 provide operational data about the subsystems of the vehicle, such as rotational speed of the electric motor 104, motor load/torque, the acceleration of the vehicle 100, braking status, and/or braking torque, etc.

The infotainment head unit 112 provides an interface between the vehicle 100 and a user. The infotainment head unit 112 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 112 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 112 displays the infotainment system on, for example, the center console display.

In the illustrated example, the infotainment head unit 112 includes a sound system with the active sound desensitizer 102. The sound system plays media from a media source (e.g., radio, satellite radio, a mobile device connected via Bluetooth or an auxiliary cable, etc.). As described in connection with FIGS. 2 through 7 below, the active sound desensitizer 102 identifies a target tonal noise (e.g., a narrow band frequency or set of frequencies that are generated by the electric motor 104) and generates a desensitizing sound to be mixed with the media. The mixed desensitizing sound and media is played by the speakers 108. The desensitizing sound blends with the target tonal noise to psycho-acoustically alleviate the perception of the tonal noise by transforming the narrow frequency band of the target tonal noise into a broadband noise.

Figure 2:
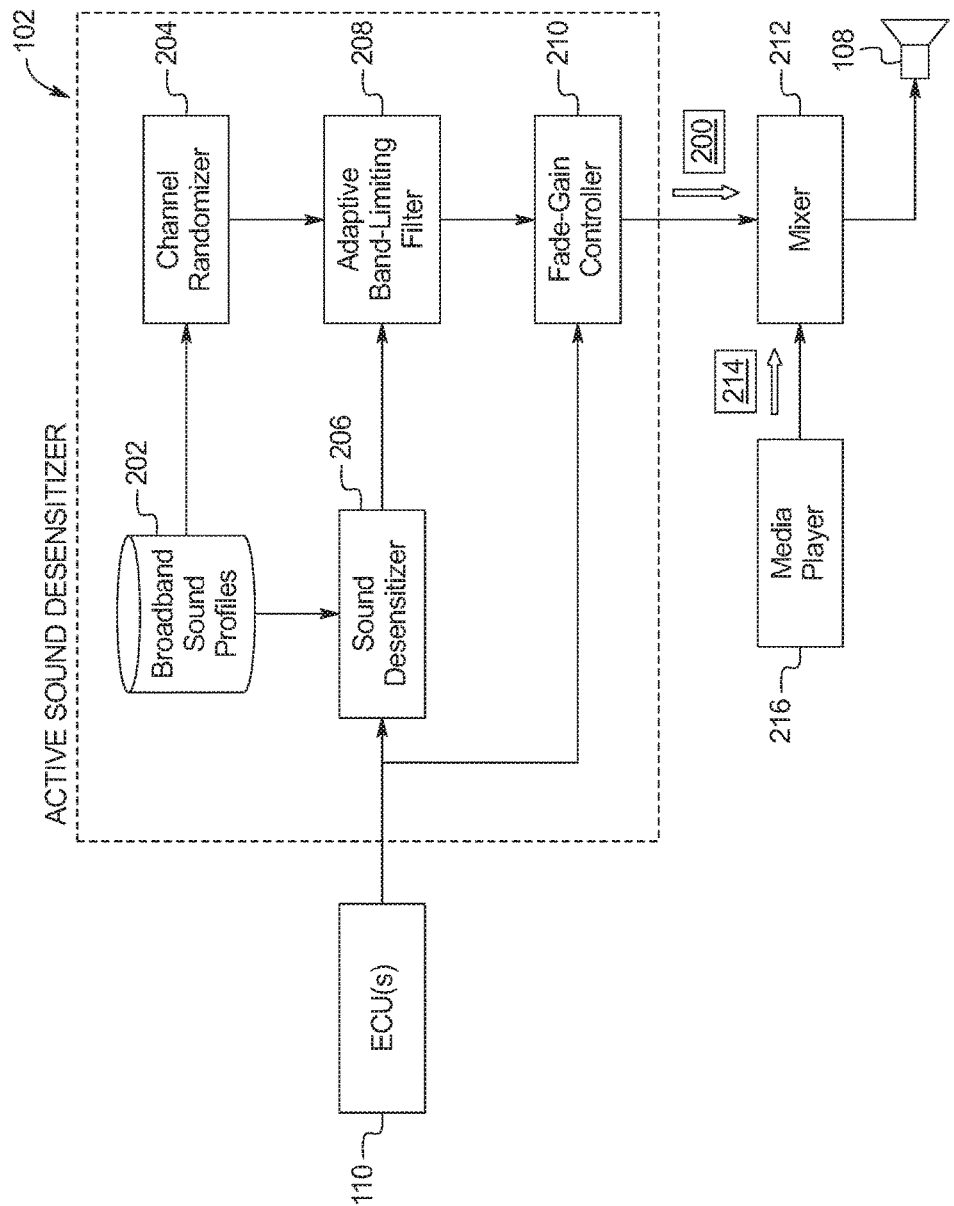
FIG. 2 is a block diagram of the active sound desensitizer of FIG. 1.

FIG. 2 is a block diagram of the active sound desensitizer 102 of FIG. 1. The active sound desensitizer 102 generates the desensitizing sound 200 in real-time based on vehicle operational data (e.g., rotational speed of the electric motor 104, motor load/torque, the acceleration of the vehicle 100, braking status, and/or braking torque, etc.) of the vehicle 100 and broadband sound profiles. As used herein, the term "real-time" refers to the active sound desensitizer 102 changing the desensitizing sound 200 based on the current vehicle operational data (e.g., as the vehicle operational data changes, the active sound desensitizer 102 changes the desensitizing sound 200). The active sound desensitizer 102 uses speaker channels randomization to randomize multiple uncorrelated broadband sound profiles to generate the desensitizing sound 200. In the illustrated example, the active sound desensitizer 102. In the illustrated example, the active sound desensitizer 102 includes a database of broadband sound profiles 202, a channel randomizer 204, a sound desensitizer 206, an adaptive band-limiting filter 208, and a fade-gain controller 210.

The database of broadband sound profiles 202 includes uncorrelated broadband sound profiles based on audio capture by the microphone 106 positioned in a location near the ear of the driver when the driver is seated. As disclosed in more detail in connection with FIG. 3 below, the uncorrelated broadband sound profiles include background noise characteristics of the cabin of the vehicle 100, a tonality analysis of the tonal noises in the cabin of the vehicle 100, and audio system dynamic characteristics that characterize the audio system of the vehicle 100. As disclosed in more detail in connection with FIG. 4 below, the sound desensitizer 206 uses the background noise characteristics of the cabin of the vehicle 100 and the tonality analysis of the tonal noises in the cabin of the vehicle 100 to determine parameters of the adaptive band-limiting filter 208. Additionally, the channel randomizer uses the audio system dynamic characteristics that characterize the audio system of the vehicle 100 to determine parameters of the adaptive band-limiting filter 208.

The channel randomizer 204 receives or otherwise retrieves one or more uncorrelated broadband sound profiles from the database of broadband sound profiles 202. The channel randomizer 204 repeats the broadband sound profile(s) on a loop while the active sound desensitizer is activated.

In some examples, the channel randomizer 204 (a) measures the response of each of the speakers 108 and (b) calculates a decay time of each of the speakers 108 based on the impulse response of the particular speaker 108. For example, channel randomizer 204 may calculate the time for the speakers 108 to decay five percent or by 30 decibels (dB). In such examples, the channel randomizer 204 determines an offset time (Δt). The offset time (Δt) is greater than or equal to the highest decay time of all the speakers 108. In some such examples, the offset time (Δt) is a random value where (i) the offset time (Δt) greater than or equal to the highest decay time of all the speakers 108, and (b) the duration of the broadband sound profile is at least N times the broadband sound profile, where N is the number of speaker 108. In such examples, the channel randomizer 204 uses one broadband sound profile for all of the channels associated with the speakers and each speaker starts at a different point in the broadband sound profile based on the offset time (Δt). For example, the a first channel starts a time zero, a second channel starts at Δt, and a third channel starts a 2Δt, etc. Alternatively, in some examples, the channel randomizer 204 uses a different one of multiple uncorrelated broadband sound profiles for each of the channels associated with the speakers 108.

The sound desensitizer 206 receives or otherwise retrieves operational data from the ECUs 110 and determines a target tonal noise frequency. As disclosed in more detail in connection with FIG. 4 below, the sound desensitizer 206 selects an upper and lower frequency band limits for the adaptive band-limiting filter 208. Additionally, the sound desensitizer 206 selects a real-time filter gain.

The adaptive band-limiting filter 208 generates a broadband noise (e.g., the desensitizing sound 200) to mask the target tonal noise determined by the sound desensitizer 206. Based on the upper and lower frequency band limits and the real-time filter gain, the adaptive band-limiting filter 208 covers the target tonal noise frequency and its surrounding frequency band. The upper and lower frequency band limits of the adaptive band-limiting filter 208 include a critical band for the target tonal noise frequency. The critical band is a band of frequencies in which a second noise frequency interferes with the perception of the target tonal noise frequency. The adaptive band-limiting filter 208 includes (i) a band-pass filter, (ii) a multiple band-pass filters, or (iii) a filter bank which includes of a number of band-pass filters with each one carry a frequency sub-band. In some examples, the adaptive band-limiting filter 208 uses variable sampling rates. The adaptive band-limiting filter 208 uses the real-time filter gain to amplify or attenuate the broadband noise to normalize the broadband noise.

The fade-gain controller 210 applies fade and gain to the desensitizing sound 200 generated by the adaptive band-limiting filter 208 based on the operational characteristic of the vehicle 100 received from the ECUs 110. The gain affects the overall loudness of the desensitizing sound 200. The fade affects the proportion of the loudness of the desensitizing sound 200 in the individual speaker channels.

A mixer 212 receives or otherwise retrieves the desensitizing sound 200 from the active sound desensitizer 102. The mixer 212 mixes the desensitizing sound 200 with an audio signal 214 received from a media player 216. For example, the audio signal 214 may be a song. The mixer 212 mixes the desensitizing sound 200 per channel of the speakers 108. In such a manner, the desensitizing sound 200 is mixed with the audio signal 214 to facilitate masking the tonal noise without interfering with the occupants' enjoyment of the media being listened to.

Figure 3:
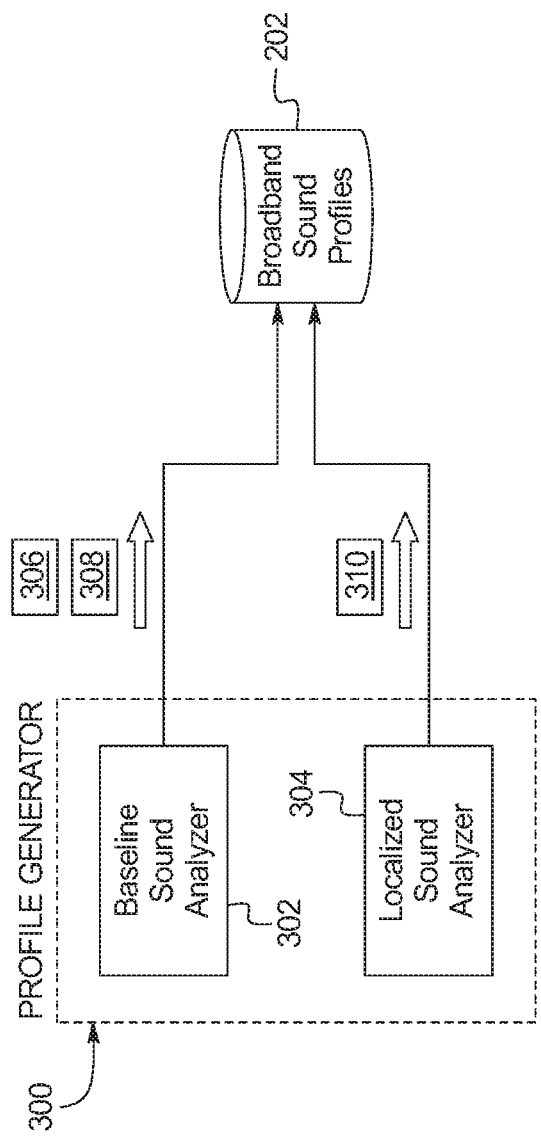
FIG. 3 is a block diagram of a profile generator.

FIG. 3 is a block diagram of a profile generator 300 to generate uncorrelated broadband sound profiles stored in the database of broadband sound profiles 202. In the illustrated example, the profile generator 300 includes a baseline sound analyzer 302 and a localized sound analyzer 304.

The baseline sound analyzer 302 generates a sound map generated by the microphone 106 based on operating the vehicle 100 in different conditions that include the tonal noise. The baseline sound analyzer 302 analyzes the sound map to determine background noise characteristics 306 and a tonality analysis 308. The background noise characteristics 306 associate the lower and upper frequency band limits for the adaptive band-limiting filter 208 with the target tonal noise frequencies. The tonality analysis 308 associates the real-time filter gain with the target tonal noise frequencies. The background noise characteristics 306 and the tonality analysis 308 provide parameters to generate the broadband noise of the desensitizing sound 200 based on the acoustic properties of the vehicle 100 and the electric motor 104.

The background noise characteristics 306 include upper frequency band limits and a lower frequency band limits associated with target tonal noises. The baseline sound analyzer 302 analyzes the sound map to determine the upper frequency band limits and a lower frequency band limits. FIG. 5 illustrates an example graph 500 of a target tonal frequency ($f_t$) 500, the upper frequency band limit ($f_u$) 502 and the lower frequency band limit ($f_l$) 504. The target tonal frequency ($f_t$) 500 is asymmetrically positioned between the upper frequency band limit ($f_u$) 502 and the lower frequency band limit ($f_l$) 504. The upper frequency band limit is at least a fixed frequency above the target tonal frequency. In some examples, the upper frequency band limit ($f_u$) 502 is determined according to Equation (1) below.

$$f_u \geq k \times f_t \qquad \text{Equation (1)}$$

In Equation (1) above, k is a constant value. In some examples, k is 1.10. For example, if the target tonal frequency ($f_t$) is 1050 Hertz (Hz), the upper frequency band limit ($f_u$) 502 is greater than or equal to 1155 Hz (1050× 1.10).

The lower frequency band limit ($f_l$) 504 is based on an octave analysis of the background noise characteristics 306. FIG. 6 illustrates a graph 600 of an example analysis of the sound map. The baseline sound analyzer 302 determines an octave frequency band ($C_O$) containing the target tonal frequency ($f_t$) 500. The octave frequency band analysis may be done, for example, in ⅓ octaves or ½ octaves. The baseline sound analyzer 302 compares noise levels in factional octave frequency bands with the noise level of the octave frequency band ($C_O$) containing the target tonal frequency ($f_t$) 500. The baseline sound analyzer 302 identifies the lowest fractional octave frequency band ($C_L$) whose noise level is less than the noise level of the octave frequency band ($C_O$) containing the target tonal frequency ($f_t$) 500. The baseline sound analyzer 302 determines the lower frequency band limit ($f_l$) 504 in accordance with Equation (2) below.

$$f_l \leq \text{lower band limit of } C_L \qquad \text{Equation (2)}$$

For example, if the target tonal frequency ($f_t$) is 1050 Hz and the octave frequency band ($C_O$) containing the target tonal frequency ($f_t$) 500 is the 1000 Hz band, the lowest ⅓ octave frequency band ($C_L$) whose noise level is less than the noise level of the octave frequency band ($C_O$) containing the target tonal frequency ($f_t$) 500 may be 500 Hz. In such an example, the lower frequency band limit ($f_l$) 504 may be 445 Hz.

The localized sound analyzer 304 generates compensation audio system dynamic characteristics 310 based on inverse modeling and filtering of the sound map. The compensation audio system dynamic characteristics 310 characterize the audio system and the speakers 108 of the vehicle 100. For example, the compensation audio system dynamic characteristics 310 may include compensation for the acoustical transfer functions of the speakers 108. The channel randomizer 204 uses the compensation audio system dynamic characteristics 310 to, based on the acoustic profile the audio system and the speakers 108, randomize the channel output of the desensitizing sound 200 to provide a smoother desensitization of the tonal noise.

Figure 4:
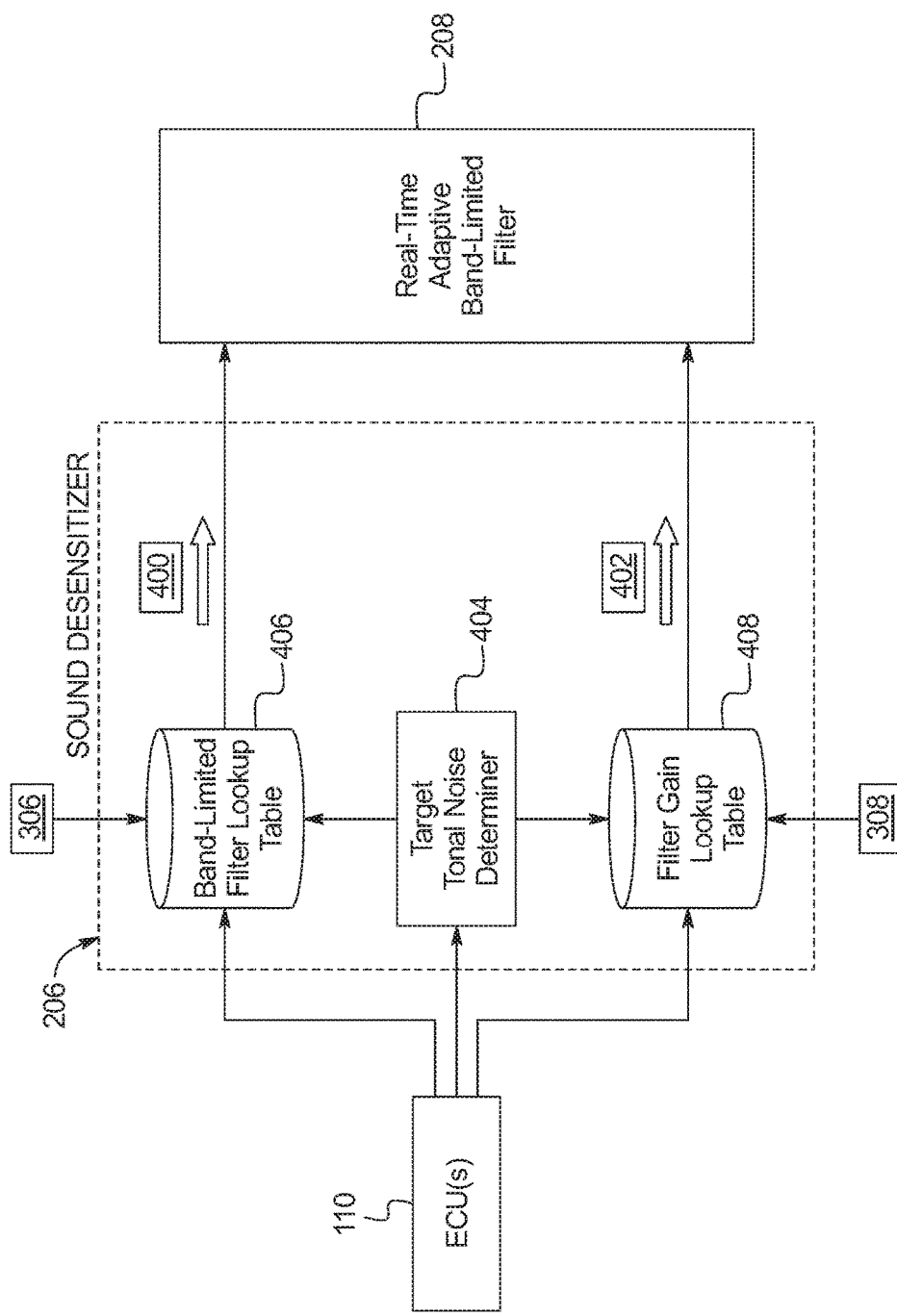
FIG. 4 is a block diagram of the sound desensitizer of FIG. 2.

FIG. 4 is a block diagram of the sound desensitizer 206 of FIG. 2. The sound desensitizer 206 provides the upper and lower frequency band limits 400 and the real-time gain filter 402 for the adaptive band-limiting filter 208. In the illustrated example, the sound desensitizer 206 includes a target tonal noise determiner 404, a band-limiting filter lookup table 406, and a filter gain lookup table 408.

The target tonal noise determiner 404 selects the target tonal noise based on the vehicle operational data (as rotational speed of the electric motor 104, motor load/torque, the acceleration of the vehicle 100, braking status, and/or braking torque, etc.) received from the ECUs 110. The target tonal noise frequency is proportional to the rotational speed of the electric motor 104. The target tonal noise changes with speed change of the electric motor 104. The target tonal noise is a frequency in the narrow band of frequencies that constitute the tonal noise.

The band-limiting filter lookup table 406 is a multi-dimensional lookup table based on the background noise characteristics 306 stored in the database of broadband sound profiles 202. The upper and lower frequency band limits 400 include the upper frequency band limit ($f_u$) 502 and the lower frequency band limit ($f_l$) 504. The upper and lower frequency band limits 400 are retrieved based on the target tonal frequency as describe in connection with FIG. 3 above. The filter gain lookup table 408 is a multi-dimensional lookup table based on the tonality analysis 308 stored in the database of broadband sound profiles 202. The real-time gain filter 402 is retrieved based target tonal frequency.

FIGS. 7A and 7B illustrate example sound maps before and after active sound desensitization. FIG. 7A illustrates a sound map 700 with a tonal noise 702 that appears as a narrow band of frequencies. The tonal noise 702 changes as the operational values of the vehicle 100 (e.g., the rotation speed of the electric motor 104, etc.) change. FIG. 7B illustrates a sound map 706 wherein the tonal noise 702 noise is masked by a broadband noise 708 when the speakers 108 play the desensitizing sound 200.

Figure 8:
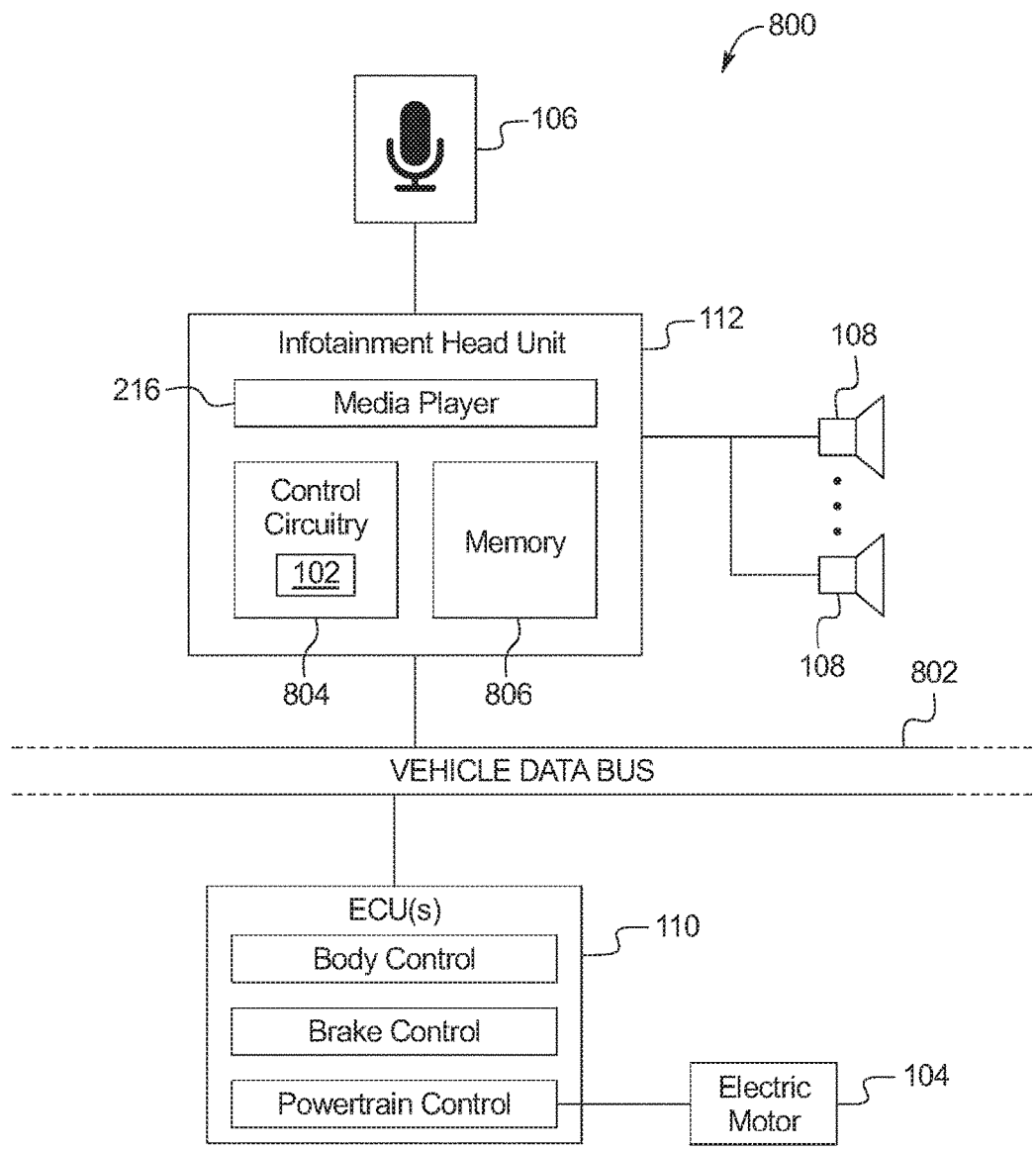
FIG. 8 is a block diagram of electronic components of the vehicle of FIG. 1.

FIG. 8 is a block diagram of electronic components 800 of the vehicle of FIG. 1. In the illustrated example, the electronic components 800 include the electric motor 104, the microphone 106, the speakers 108, the ECUs 110, the infotainment head unit 112, and a vehicle data bus 802.

The infotainment head unit 112 includes control circuit 804 and memory 806. In the illustrated example, the infotainment head unit 112 is structured to include active sound desensitizer 102. The control circuit 804 may be a combination of integrated and discrete circuit components and/or any suitable processing device or set of processing devices such as, but not limited to: a microprocessor, a microcontroller-based platform, a digital signal processor, one or more field programmable gate arrays (FPGAs), and/or one or more application-specific integrated circuits (ASICs). The memory 806 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, solid-state memory, etc.), unalterable memory (e.g., EPROMs), read-only memory, and/or high-capacity storage devices (e.g., hard drives, solid state drives, etc). In some examples, the memory 806 includes multiple kinds of memory, particularly volatile memory and non-volatile memory.

The memory 806 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 806, the computer readable medium, and/or within the control circuit 804 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 802 communicatively couples the ECUs 110 and the infotainment head unit 112. In some examples, the vehicle data bus 802 includes one or more data buses. The vehicle data bus 802 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 9:
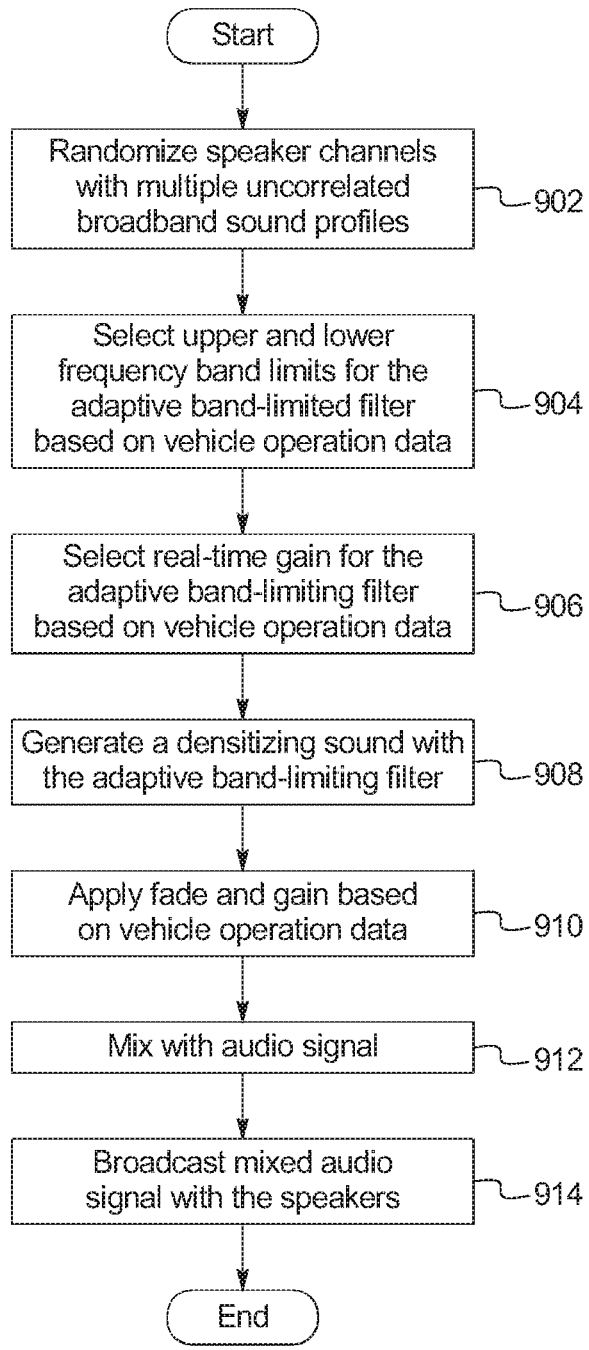
FIG. 9 is a flowchart of a method to actively desensitize tonal noise in the vehicle of FIG. 1, which may be implemented by the electronic components of FIG. 8.

FIG. 9 is a flowchart of a method to actively desensitize tonal noise in the vehicle 100 of FIG. 1, which may be implemented by the electronic components 800 of FIG. 8. Initially, the channel randomizer 204 randomizes the speaker channels with multiple uncorrelated broadband sound profiles (e.g. the compensation audio system dynamic characteristics 310) stored in the database of broadband sound profiles 202 (block 902). The sound desensitizer 206 selects, in real time, the upper and lower frequency band limits 400 for the adaptive band-limiting filter 208 based on (i) the target tonal frequency ($f_t$) 500 derived from the vehicle operation data and (ii) the background noise characteristics 306 stored in the database of broadband sound profiles 202 (block 904). The sound desensitizer 206 selects, in real time, a gain filter based on (i) the target tonal frequency ($f_t$) 500 derived from the vehicle operation data and (ii) the tonality analysis 308 stored in the database of broadband sound profiles 202 (block 906).

The adaptive band-limiting filter 208 generates the desensitizing sound 200 based on the randomized channels, the upper and lower frequency band limits 400, and the gain filter (block 908). The fade-gain controller 210 applies a fade and gain on the desensitizing sound 200 based on the vehicle operation data (block 910). The mixer 212 mixes the desensitizing sound 200 with an audio signal (if any) from the media player 216 (block 912). The speakers 108 then broadcast the mixed auto signal into the cabin of the vehicle 100 (block 914).

Figure 10:
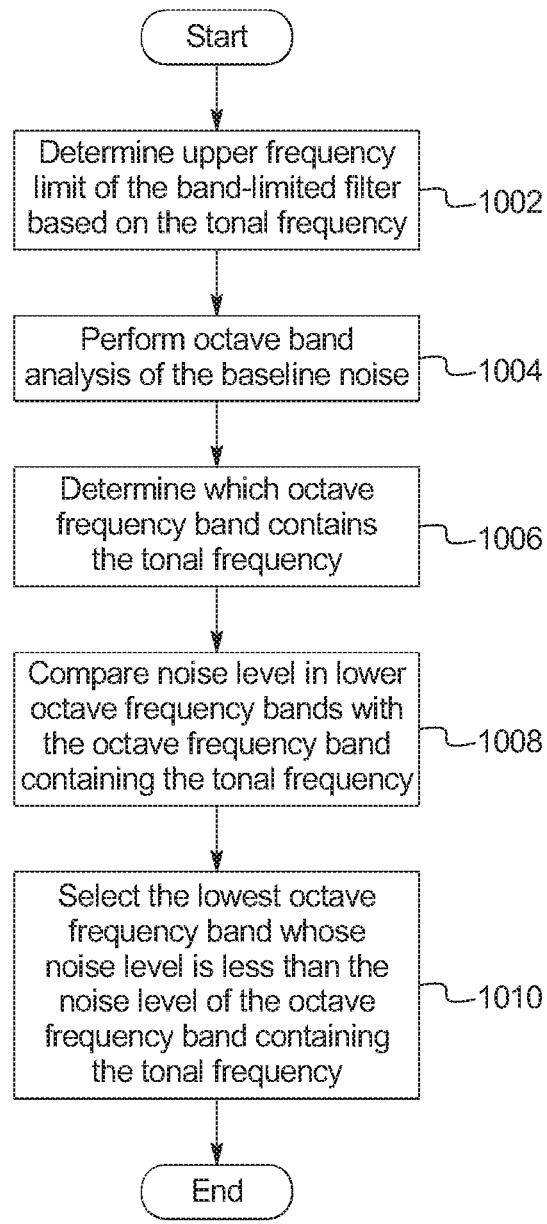
FIG. 10 is a flowchart of a method to determine the upper and lower frequency band limits of the adaptive band-limited filter of the sound desensitizer of FIGS. 1 and 2, which may be implemented by the electronic components of FIG. 8.

FIG. 10 is a flowchart of a method to determine the upper and lower frequency band limits 400 of the adaptive band-limiting filter 208 of the active sound desensitizer 102 of FIGS. 1 and 2, which may be implemented by the electronic components 800 of FIG. 8. Initially, for a range of the target tonal frequencies ($f_t$) 500, the baseline sound analyzer 302 determines upper frequency band limits ($f_u$) 502 (block 1002). In some examples, the baseline sound analyzer 302 determines upper frequency band limits ($f_u$) 502 in accordance with Equation (1) above. The baseline sound analyzer 302 performs an octave band analysis on the background noise characteristics 306 of the sound map based on audio captured by the microphone 106 (block 1004). In some examples, the octave band analysis uses ⅓ octave bands. The baseline sound analyzer 302 determines the octave frequency band ($C_O$) containing the target tonal frequency ($f_t$) 500 (block 1006). The baseline sound analyzer 302 compares noise levels in factional octave frequency bands with the noise level of the octave frequency band ($C_O$) containing the target tonal frequency ($f_t$) 500 (block 1008). The baseline sound analyzer 302 (a) identifies the lowest fractional octave frequency band ($C_L$) whose noise level is less than the noise level of the octave frequency band ($C_O$) containing the target tonal frequency ($f_t$) 500 and (b) determines the lower frequency band limit ($f_l$) 504 to less than or equal to the lower band limit of the lowest fractional octave frequency band ($C_L$) in accordance with Equation (2) above. (1010).

The flowcharts of FIGS. 9 and 10 are representative of machine readable instructions stored in memory (such as the memory 806 of FIG. 8) that comprise one or more programs that, when executed by a control circuit (such as the control circuit 804 of FIG. 8), cause the vehicle 100 to implement, in hardware, software, or a combination thereof, the example active sound desensitizer 102 of FIGS. 1 and 2 and/or the example profile generator 300 of FIG. 3. Further, although the example program(s) is/are described with reference to the flowcharts illustrated in FIGS. 9 and 10, many other methods of implementing the example active sound desensitizer 102 and/or the example profile generator 300 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle with an electric motor comprising:
   a microphone;
   speakers; and
   an active sound desensitizer configured to:
      randomize channels of the speakers based on multiple uncorrelated broadband sound profiles;
      determine upper and lower frequency band limits for a band-limited filter;
      generate a desensitizing sound based on the upper and lower frequency band limits and the randomized channels; and
      broadcast the desensitizing sound via the speakers.

2. The vehicle of claim 1, wherein the microphone is positioned to be near a head of a driver when the driver is sitting in a driver's seat.

3. The vehicle of claim 1, wherein the multiple uncorrelated broadband sound profiles are based on a sound map of audio captured by the microphone.

4. The vehicle of claim 3, including a profile generator configured to generate the multiple uncorrelated broadband sound profiles by inverse modeling and filtering the sound map.

5. The vehicle of claim 1, wherein the active sound desensitizer is to determine a target tonal frequency based on vehicle operation data provided by electronic control units.

6. The vehicle of claim 5, wherein the vehicle operation data include a rotation speed of the electric motor.

7. The vehicle of claim 5, wherein the upper and lower frequency band limits are positioned asymmetrically around the target tonal frequency.

8. The vehicle of claim 5, wherein the upper frequency band limit is greater than or equal to a constant value multiplied by the target tonal frequency.

9. The vehicle of claim 5, wherein the lower frequency band limit is a variable value based on background noise characteristic of the vehicle.

10. The vehicle of claim 9, wherein the lower frequency band limit is determined by:
    determining, from a plurality of one-third octave frequency bands, a first one-third octave frequency band containing the target tonal frequency;
    comparing noise levels in the plurality of one-third octave frequency bands with a noise level of the first one-third octave frequency band; and
    identifying a second one of the plurality of one-third octave frequency bands that is a lowest one of the plurality of one-third octave frequency bands with the noise level that is less than the first one-third octave frequency band.

11. A method comprising:
    randomizing, with a control circuit, output to channels of speakers based on multiple uncorrelated broadband sound profiles, the multiple uncorrelated broadband sound profiles based on a sound map of audio in a cabin of a vehicle captured by a microphone;
    determining, with the control circuit, upper and lower frequency band limits for a band-limited filter;
    generating a desensitizing sound based on the upper and lower frequency band limits and the randomized channels; and
    broadcasting the desensitizing sound via the speakers.

12. The method of claim 11, including generating the multiple uncorrelated broadband sound profiles by inverse modeling and filtering the sound map.

13. The method of claim 11, including determining a target tonal frequency based on vehicle operation data provided by electronic control units, the vehicle operation data including a rotation speed of an electric motor of the vehicle, the upper and lower frequency band limits being positioned asymmetrically around the target tonal frequency.

14. The method of claim 13, wherein:
the upper frequency band limit is greater than or equal to a constant value multiplied by the target tonal frequency; and
the lower frequency band limit is a variable value based on background noise characteristic of the vehicle.

15. The method of claim 14, wherein determining the lower frequency band limit includes:
determining, from a plurality of one-third octave frequency bands, a first one-third octave frequency band containing the target tonal frequency;
comparing noise levels in the plurality of one-third octave frequency bands with a noise level of the first one-third octave frequency band; and
identifying a second one of the plurality of one-third octave frequency bands that is a lowest one of the plurality of one-third octave frequency bands with the noise level that is less than the first one-third octave frequency band.

* * * * *